March 26, 1940.    W. J. HALL    2,195,086
METHOD OF MANUFACTURING MOLDING
Original Filed April 26, 1938
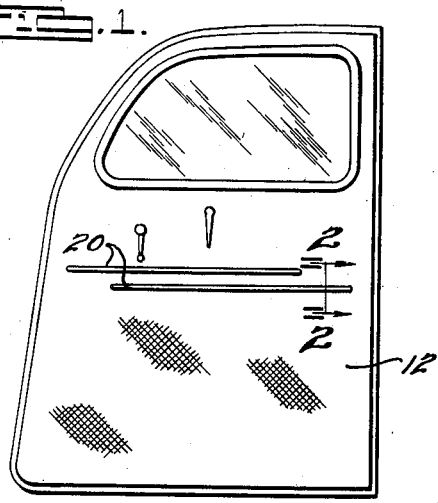
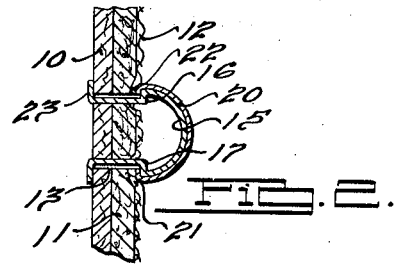
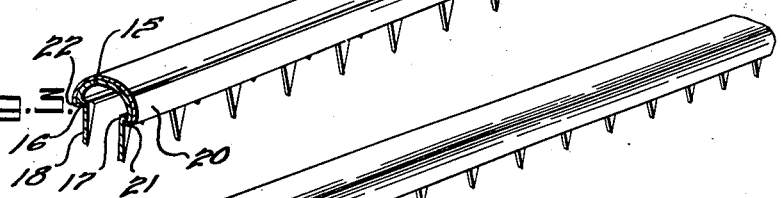
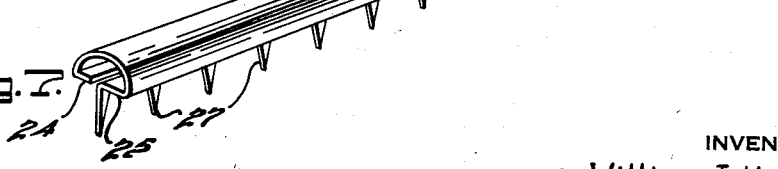
INVENTOR
William J. Hall
BY
Harness, Dickey & Pierce
ATTORNEYS Patented Mar. 26, 1940

2,195,086

UNITED STATES PATENT OFFICE 2,195,086

METHOD OF MANUFACTURING MOLDING

William J. Hall, Detroit, Mich., assignor to Herron-Zimmers Moulding Company, Detroit, Mich., a corporation of Illinois Original application April 26, 1938, Serial No. 204,383. Divided and this application November 28, 1938, Serial No. 242,707

1 Claim. (Cl. 113—116)

The invention relates generally to molding and has particular relation to ornamental molding for use in motor vehicles.

In certain respects, the invention provides improvements over the structures disclosed and claimed in my co-pending application for patent Serial No. 187,281, filed January 27, 1938, and it also constitutes a division of my co-pending application for patent Serial No. 204,383, filed April 26, 1938.

One object of the invention is to provide moldings having integral attaching prongs wherein improved means are employed for seating the molding on a support and for concealing the attaching prongs.

Another object of the invention is to provide molding substantially channel-shaped in cross-section and which has integral attaching prongs located substantially at the center line of the molding.

Another object of the invention is to provide an improved molding comprising inner and outer members substantially of the same shape, wherein the inner member is provided with integral attaching prongs.

Another object of the invention is to provide an improved method of manufacturing a channel-shaped molding having integral attaching prongs projecting from one edge portion of the molding.

Other objects of the invention will become apparent from the following specification, the drawing to which it relates, and from the claim hereinafter set forth.

For a better understanding of the invention, reference may be had to the drawing wherein:

Figure 1 illustrates the inner side of a door for a motor vehicle having a molding supplied thereto as constructed according to one form of the invention;

Fig. 2 is a cross-sectional view taken substantially along the line 2—2 of Fig. 1, but on a larger scale;

Fig. 3 is a generally perspective view of a strip of molding such as embodied in Fig. 2, as seen prior to its application;

Fig. 4 is a view similar to Fig. 3 but illustrating molding constructed according to another form of the invention;

Fig. 5 is a perspective view illustrating the inner member of the molding shown by Fig. 4, as seen at the intermediate stage in its manufacture, along with a lower die member employed in forming the attaching prongs;

Fig. 6 is a view similar to Fig. 5, illustrating the inner member as seen after the prongs are formed; and Fig. 7 is a view similar to Fig. 6 showing the inner member after the flange from which the prongs project has been bent into its final position.

While molding, such as constructed according to the invention, may be applied in different places, it is particularly adapted for application on upholstered parts of a vehicle body such as on the inner sides of the doors. Normally, the inner sides of a motor vehicle door will be covered by a fiber board 10, padding 11, and fabric 12. The molding is adapted to be fastened to this assembly by means of prongs on the molding that pass through openings 13 in the fabric, padding, and fiber board.

Now referring to Figure 3, the molding illustrated comprises an inner member 15 generally of channel shape and which has, at its edges, inwardly turned flanges 16 and 17 that lie substantially in the same plane. From the inner edges of the flanges 16 and 17, prongs 18 project in a direction away from the channel and substantially at right angles to the plane of the flanges. A number of these prongs are provided along each flange and such prongs may be aligned transversely or they may be arranged in laterally alternating relation. It is apparent that the inner member may be constructed from a flat strip of steel by striking out metal along side edges of the strip to form the prongs, shaping the strip to provide the flanges 16 and 17, and then forming the channel and simultaneously disposing the flanges and prongs in the relation shown. In its general aspects, the method of forming a molding member is disclosed and claimed in the co-pending application previously mentioned.

The inner member alone may constitute molding but, as shown, it is assembled with an outer cover strip 20 of substantially the same shape and which has short inturned flanges 21 and 22 at its edges that slightly project under the flanges 16 and 17. By using this assembly of inner and outer members, the inner member may be constructed of a malleable, less expensive steel and the outer member may be constructed of a relatively thin and non-tarnishable metal such as stainless steel. Thus, a less expensive metal is employed for actual attachment purposes and since it is more malleable, formation of the prongs is rendered easier and simpler and, moreover, application of the molding is less difficult since the prongs may be clamped against the inner side of the supporting member with less difficulty.

When the molding is applied to a support such as shown by Fig. 2, the flanges at the edges of the molding are pressed against the fabric 12 and the inner ends of the prongs are clamped over against the inner side of the fiber board, as indicated at 23. By having the prongs inwardly of the side edges of the molding, by providing the side edge flanges 16 and 17, the prongs are more easily concealed and even though the flanged edges of the molding did not actually contact the fabric 12, the prongs would not ordinarily be visible. Again the flanges 16 and 17 provide a substantial and flat area of engagement of the molding and fabric and thus less indentation of the fabric would occur when the prongs are clinched against the inner side of the fiber board.

The cover 20 may be assembled with the inner member by telescoping the former over the latter or the flanges on the cover member may be of such dimensions and shape that the cover may be snapped onto the inner member by pressing the cover downwardly over the inner member until the edges of the cover snap under the flanges 16 and 17.

In the construction shown by Fig. 4, the inner member has wider flanges 24 and 25 and prongs are provided only on flange 25 substantially along the center line of the molding. The cover member in this construction may be substantially identical to the cover 20 shown by Fig. 3 and may be assembled with the inner member in substantially the same way as previously described.

In manufacturing the inner member of the structure shown by Fig. 4, a flat strip of metal is passed between forming rolls to provide the channel, flanges 24 and 25, and an additional flange 27 from which the prongs are to be formed. The arrangement of rollers is such that the flanges 25 and 27 are removed from the final positions they are to assume although it is desirable to place the flanges near their final position so that the final shaping operation will not require an undesirable bending of the flange 25 about its junction with the channel edge. If the flanges were arranged in their final positions before forming the prongs, it would be more difficult to place the prong forming dies and to form the prongs owing to the fact that such prongs extend to the edge of the flange 25. By disposing the flanges 25 and 27 in the positions shown in Fig. 5, a die member 30 may be easily positioned against the under side of the flange 27 and then a complementary punch member may be used against the upper side of flange 27 to strike out metal between the openings in the die member 30 so as to leave the prongs. Fig. 6 shows the inner member formed with the prongs prior to bending the flange 25 into its final position, while Fig. 7 shows the finished structure with the flange and prongs in proper position.

It will be understood that it is preferable to form the inner member shown in Fig. 3 by means of stamping and pressing operations wherein the prongs are struck out and the strip is pressed into shape. It will be understood that the inner member shown in Figure 4, and as also illustrated by the remaining figures, preferably is formed by operations wherein a flat strip of metal is passed between rolls so as to form the structure shown by Fig. 5. Then following the prong forming operation, the flange from which the prongs project is bent to its final position. The cover member in each instance will preferably be formed by passing a strip of stainless steel between rollers in order to obtain the desired shape.

It is evident from the description and from the drawing that the molding may be applied easily and that once the prongs are clinched over against the inner side of the fiber board, the molding is positively attached. In either case, the upper ends of the prongs are concealed owing primarily to the overhanging edges of the molding. It is also evident that the constructions may be manufactured simply and inexpensively through stamping or rolling operations, as the case may be. Either construction is inexpensive since a minimum number of parts is required and since the attaching prongs are integral with the molding.

Although more than one form of the invention has been illustrated and described in detail, it will be apparent to those skilled in the art that various modifications may be made without departing from the scope of the appended claim.

What is claimed is:

The method of manufacturing molding of substantially channel shape having an inturned flange at one edge that is disposed substantially in the plane of both edges and attachment prongs projecting from the inner edge of the flange and away from the channel, which comprises providing a flat strip of metal, transversely forming it to provide the channel and said flange with the latter removed from its final position, also forming a second flange that projects from the edge of the first flange, striking out portions of the second flange to leave prongs projecting from the edge of the first flange and then bending the first flange about the edge of the channel to dispose the flange in said plane.

WILLIAM J. HALL.